US010533352B2

(12) United States Patent
Betzen et al.

(10) Patent No.: US 10,533,352 B2
(45) Date of Patent: Jan. 14, 2020

(54) PUSH TO RELEASE FUEL DOOR OPERATOR ASSEMBLY

(71) Applicant: GM Global Technology Operations LLC, Detroit, MI (US)

(72) Inventors: Heiko Betzen, Rüsselsheim (DE); Dirk Rainer Lungershausen, Rüsselsheim (DE); Markus Frommann, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 103 days.

(21) Appl. No.: 15/788,090

(22) Filed: Oct. 19, 2017

(65) Prior Publication Data

US 2019/0119960 A1  Apr. 25, 2019

(51) Int. Cl.
*B62D 25/00* (2006.01)
*E05B 83/34* (2014.01)
*E05C 5/04* (2006.01)
*B60K 15/05* (2006.01)
*E05B 63/22* (2006.01)
*E05C 19/02* (2006.01)

(52) U.S. Cl.
CPC ............ *E05B 83/34* (2013.01); *B60K 15/05* (2013.01); *E05B 63/22* (2013.01); *E05C 5/04* (2013.01); *E05C 19/022* (2013.01); *B60K 2015/0538* (2013.01)

(58) Field of Classification Search
CPC .............................. B60K 15/04; B60K 15/05; B60K 2015/0429; B60K 2015/0461; B60K 2015/0483; B60K 15/0406

USPC ........................................................ 296/97.22
See application file for complete search history.

(56) References Cited

U.S. PATENT DOCUMENTS

| 5,524,786 | A | * | 6/1996 | Skudlarek | B60K 15/0406 |
| | | | | | 220/262 |
| 5,658,036 | A | * | 8/1997 | Benoist | B60K 15/05 |
| | | | | | 220/86.2 |
| 5,664,811 | A | * | 9/1997 | Martus | B60K 15/05 |
| | | | | | 292/144 |
| 6,315,144 | B1 | * | 11/2001 | Foltz | B60K 15/0406 |
| | | | | | 220/255 |
| 7,293,586 | B2 | * | 11/2007 | Groom | B60K 15/04 |
| | | | | | 141/301 |
| 7,766,410 | B2 | * | 8/2010 | Tseng | B60K 15/05 |
| | | | | | 296/97.22 |
| 9,038,499 | B2 | * | 5/2015 | Ishiguro | B60K 15/05 |
| | | | | | 220/315 |

(Continued)

*Primary Examiner* — Kiran B Patel

(57) ABSTRACT

A push to release fuel filler door assembly for a motor vehicle includes a door on the exterior of the vehicle having a latch that cooperates with a spring biased plunger which rotates and translates axially. The plunger includes radially extending pins which are received in complementary helical tracks on the inner surface of an inner housing. The tracks define a closed path having a first segment, in which the pins travel while the fuel door is being closed, a second segment in which they travel while the fuel door is opening and a latching recess between the first and second segments in which the pins reside when the door is closed. The inner housing typically includes three segments or sections and is, in turn, received and retained within an outer housing which mounts on a fuel door inlet assembly.

8 Claims, 4 Drawing Sheets

(56) References Cited

U.S. PATENT DOCUMENTS

| | | | | |
|---|---|---|---|---|
| 2001/0045243 A1* | 11/2001 | Holloway | ............ | F16K 31/047 |
| | | | | 141/301 |
| 2009/0026794 A1* | 1/2009 | Zentner | ................ | B60K 15/05 |
| | | | | 296/97.22 |
| 2009/0189410 A1* | 7/2009 | Gurtatowski | ......... | B60K 15/05 |
| | | | | 296/97.22 |
| 2010/0263417 A1* | 10/2010 | Schoenow | ............ | B60K 15/05 |
| | | | | 70/101 |
| 2016/0326777 A1* | 11/2016 | Wagner | ................... | E05B 81/25 |
| 2017/0037661 A1* | 2/2017 | Tessier | ................... | E05B 77/34 |
| 2017/0066321 A1* | 3/2017 | Szawarski | ............ | B60K 15/05 |
| 2017/0174071 A1* | 6/2017 | McKinster | ........ | B60K 15/0406 |
| 2018/0051886 A1* | 2/2018 | Myers | .................... | F23B 80/04 |
| 2018/0093878 A1* | 4/2018 | Hong | .................... | B60K 15/04 |
| 2018/0105036 A1* | 4/2018 | Guardianelli | ......... | B60K 15/05 |
| 2018/0170176 A1* | 6/2018 | Yang | ..................... | B60K 15/05 |

\* cited by examiner

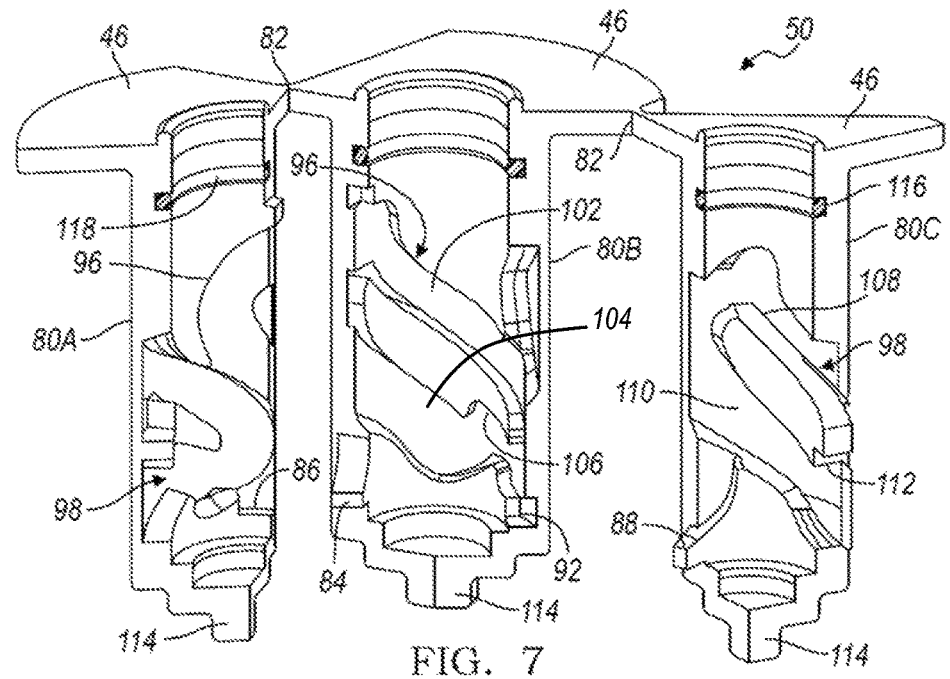
FIG. 7
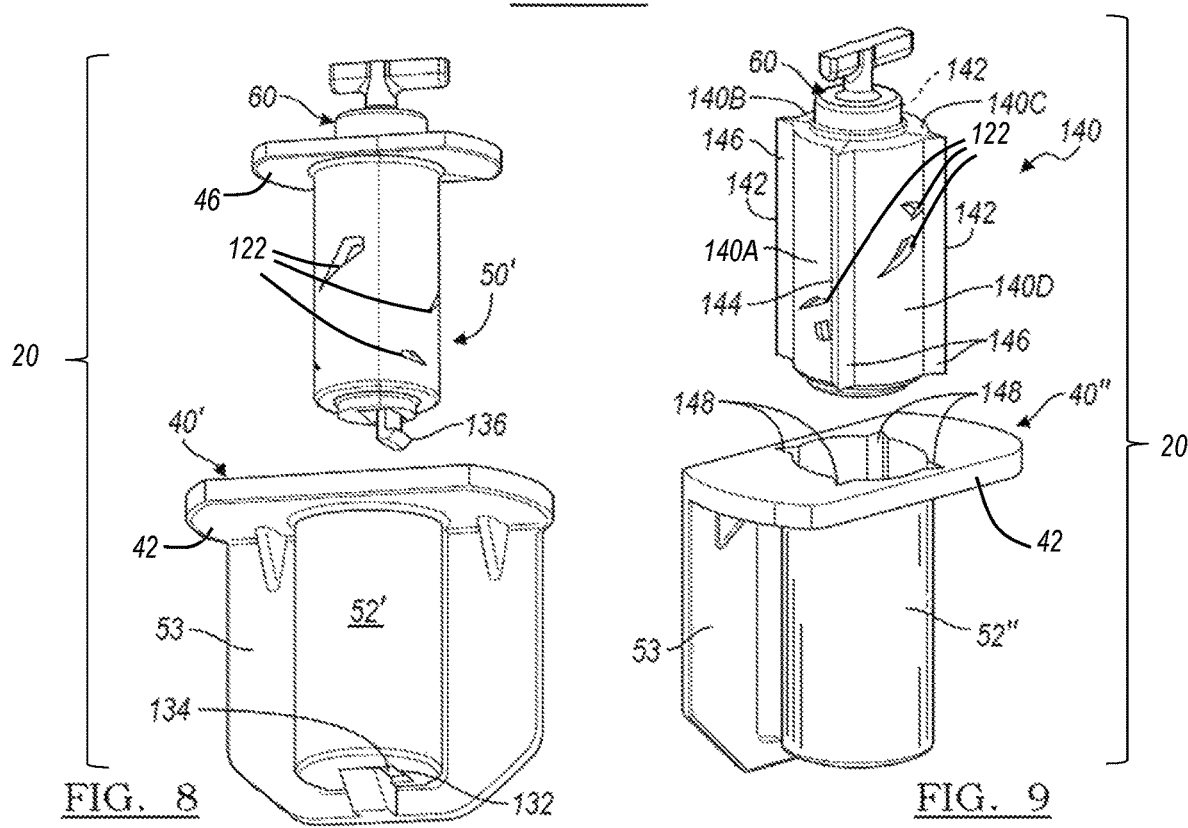
FIG. 8
FIG. 9

PUSH TO RELEASE FUEL DOOR OPERATOR ASSEMBLY

INTRODUCTION

The present disclosure relates to a fuel door device for a motor vehicle and more particularly to a push to release fuel filler door operator assembly for a motor vehicle.

As motor vehicles, especially passenger cars and light trucks continue to evolve, convenience and reliability are considerations of great importance. These considerations apply across the vehicle design, including such components as fuel filler doors. Here, these considerations take the form of easy, low effort, repeatable operation and secure closure.

Oftentimes, these operational criteria require engineering compromises that are, in the end, unsatisfactory. For example, a fuel filler door that is easy, that is, requires low effort, to open may open unnecessarily and unexpectedly when the vehicle encounters a highway irregularity such as a pothole. Filler doors that lock or positively close may require additional steps or actions beyond a simple hand motion to open them.

Thus, while current fuel door mechanisms generally achieve their intended purpose, there is a need for a new and improved mechanism for securing and releasing a fuel filler door with a simple motion by the user.

SUMMARY

A push to release and push to lock fuel filler door operator assembly for a motor vehicle includes a door on the exterior of the vehicle having a latch that cooperates with a spring biased plunger assembly which rotates and translates axially. The plunger assembly includes two radially extending pins which are received in complementary, diametrically opposed helical tracks on the inner surface of an inner housing. The tracks each define a closed path having a first segment, in which the pins travel while the fuel door is being closed, a second segment in which they travel while the fuel door is opening and a latching recess between the first and second segments in which the pins reside when the door is closed. The inner housing typically includes three segments or sections and is, in turn, received and retained by various means within an outer housing which mounts on a fuel door inlet assembly.

Thus it is an aspect of the present disclosure to provide a push to release fuel filler door operator assembly for a motor vehicle.

It is a further aspect of the present disclosure to provide a push to release and push to lock fuel filler door operator assembly for a motor vehicle.

It is a still further aspect of the present disclosure to provide a fuel filler door operator assembly for a motor vehicle that includes a door having a latch.

It is a still further aspect of the present disclosure to provide a fuel filler door operator assembly for a motor vehicle that includes a door having a latch that cooperates with a spring biased plunger assembly.

It is a still further aspect of the present disclosure to provide a fuel filler door operator assembly that includes a door having a latch that cooperates with a spring biased plunger assembly having two radially extending pins which are received in complementary helical tracks in an inner housing.

It is a still further aspect of the present disclosure to provide a fuel filler door operator assembly that includes a door having a latch that cooperates with a spring biased plunger assembly having two radially extending pins which are received in complementary helical tracks in an inner housing having first segments, second segments and latching recesses between these segments.

It is a still further aspect of the present disclosure to provide a fuel filler door operator assembly for a motor vehicle that includes a door having a latch, a spring biased plunger assembly having two radially extending pins which are received in opposed, complementary helical tracks in an inner housing and an outer housing which is secured to a fuel door and inlet assembly.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is an exploded perspective view of the three segments of the inner housing of FIG. 5;

FIG. 8 is an axially exploded perspective view of another embodiment of the outer and inner housings of FIG. 4, illustrating the outer housing having a lip and the inner housing having a latch for the lip;

FIG. 9 is a perspective view of yet another embodiment of the outer and inner housings of FIG. 4, illustrating the outer housing having multiple slots and the inner housing having multiple ribs to be received in corresponding slots.

DETAILED DESCRIPTION

The following description is merely exemplary in nature and is not intended to limit the present disclosure, application, or uses.

Figure 1:
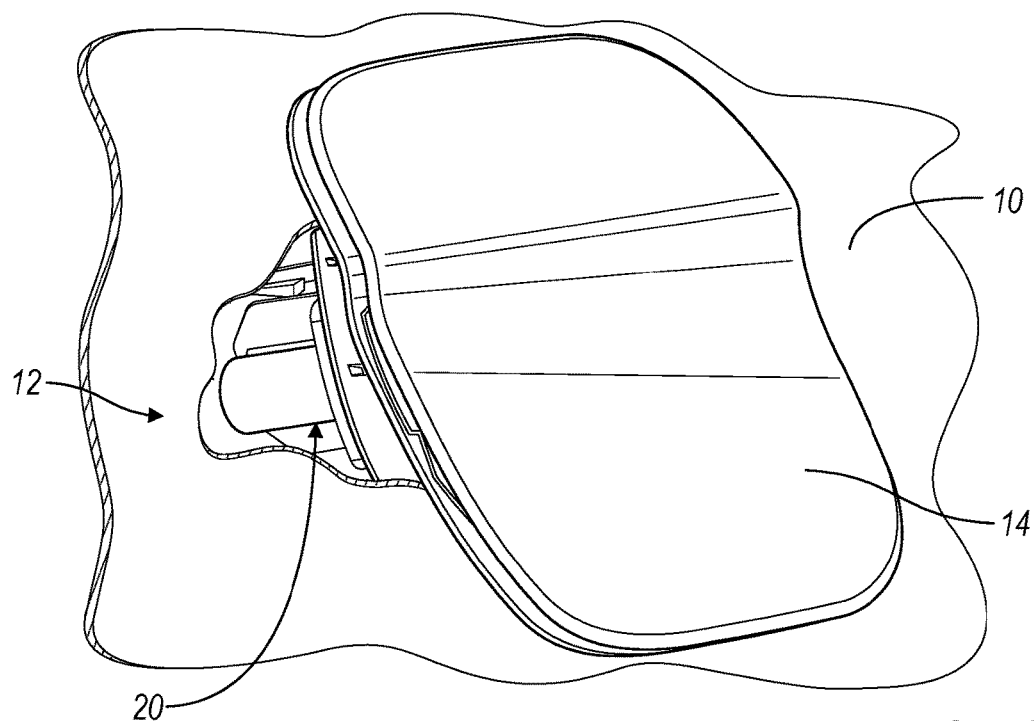
FIG. 1 is a perspective view a portion of a motor vehicle having a fender, which includes a fuel door and a fuel inlet assembly.
Figure 2:
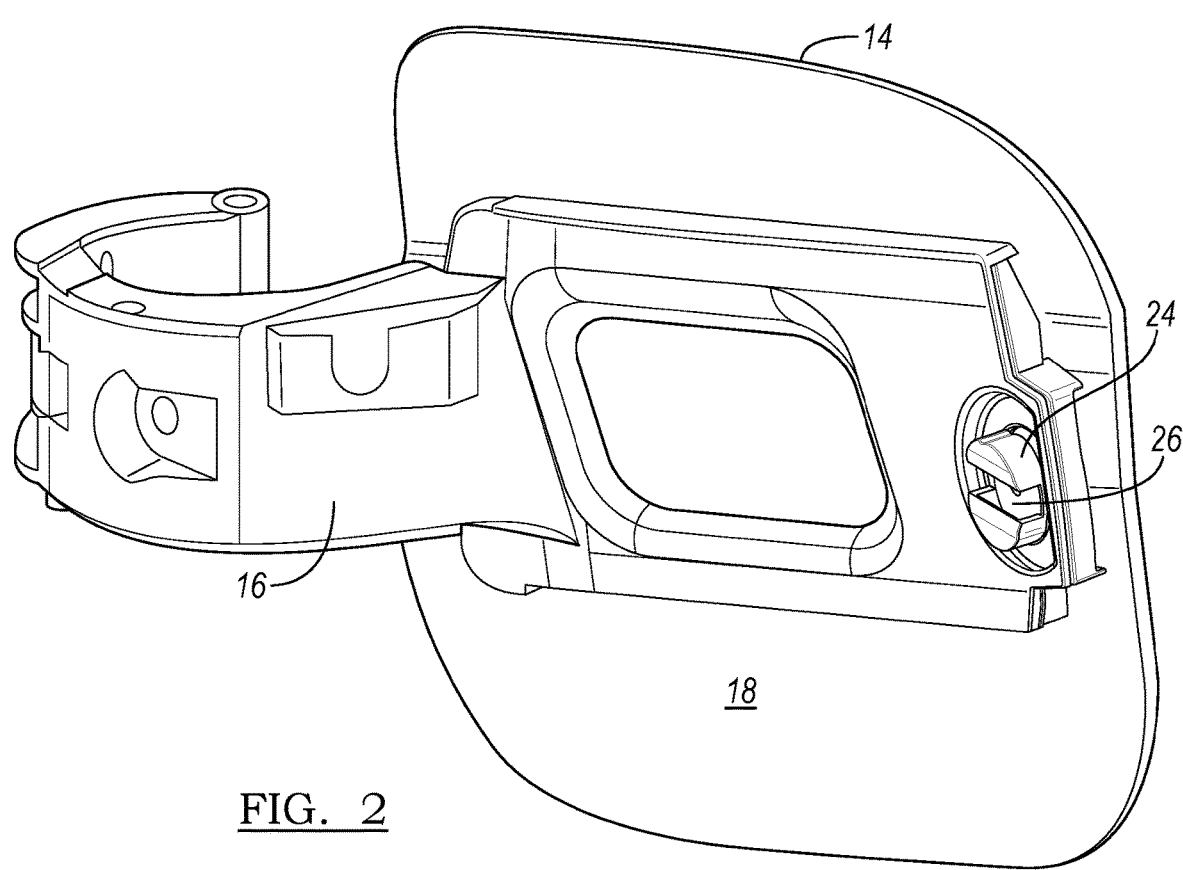
FIG. 2 is a perspective view of the inside of the fuel door of FIG. 1.

Referring to FIGS. 1 and 2, a portion of a motor vehicle body, namely a fender, is illustrated and generally designated by the reference number 10. The fender 10 includes a fuel inlet assembly 12 secured to the fender 10. The fuel inlet assembly includes a fuel door 14 typically hinged to the fuel inlet assembly 12 by one or more hinges 16. At the outset, it should be understood that the fuel inlet assembly 12 and the fuel door 14 may be utilized with a conventional gasoline, Diesel or flex fuel vehicle as well as a hybrid or plug-in vehicle in which case the fuel door covers and protects an electrical socket (not illustrated) rather than a fuel filler pipe (also not illustrated). The fuel inlet assembly 12 further includes a push to release operator assembly 20 which will be described in greater detail subsequently.

Figure 3:
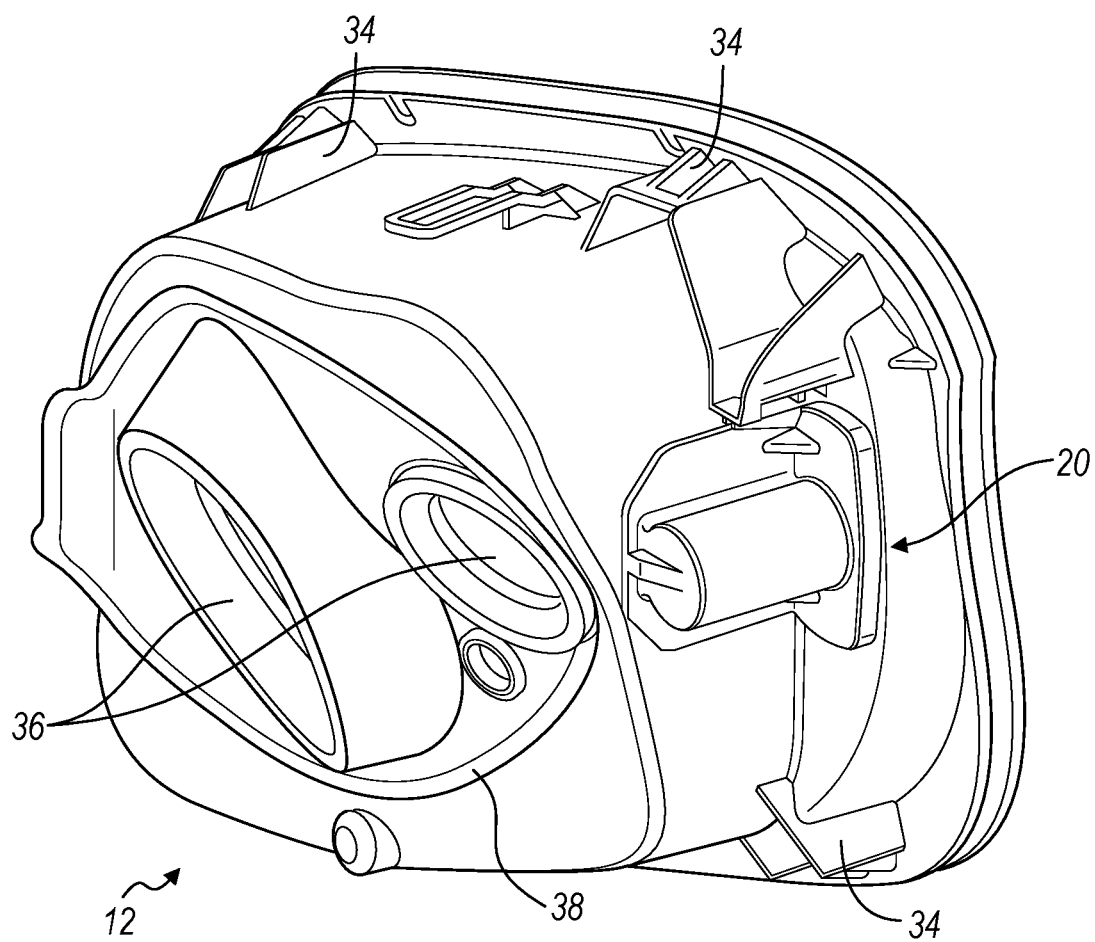
FIG. 3 is a perspective view of the rear of the fuel inlet assembly of FIG. 1, illustrating the fuel inlet assembly including a push to release fuel door operator assembly.

Referring now to FIGS. 2 and 3, the back or inside surface 18 of the fuel door 14 includes a latch member 24 spaced from the inside surface 18 of the fuel door 14 and having a slot or channel 26 that selectively receives a component of the push to release operator assembly 20. The fuel inlet assembly 12 includes the push to release operator assembly 20 as well as a plurality of flexible or resilient clips, lugs or tabs 34 that retain the fuel inlet assembly 12 in the fender 10, openings 36 which accommodate a fuel nozzle or electrical connector or vent line (all not illustrated) and one or more gaskets 38 which provide a seal between the fuel inlet assembly 12 and adjacent vehicle structure.

Figure 4:
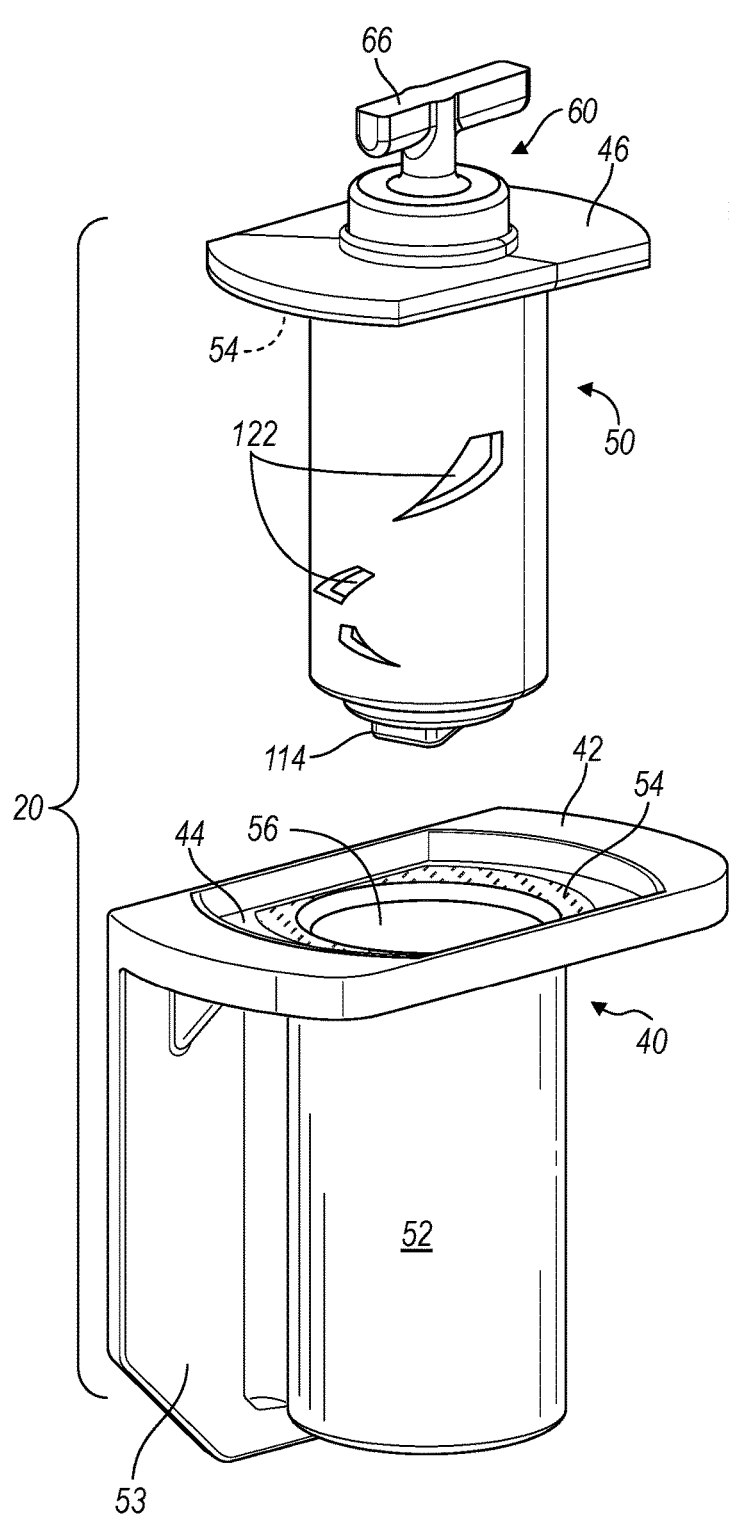
FIG. 4 is an axially exploded perspective view of the push to release operator assembly of FIG. 1, illustrating the push to release operator assembly having outer and inner housings.
Figure 5:
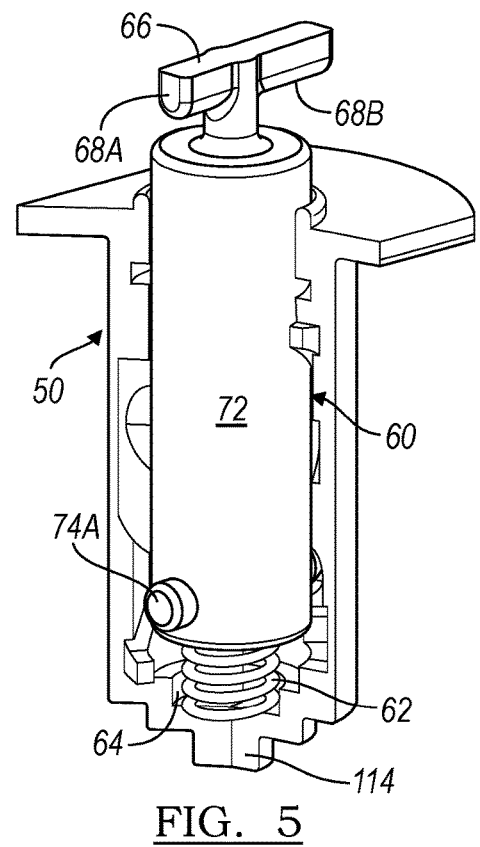
FIG. 5 is a perspective view in partial section of the inner housing of FIG. 4, illustrating a plunger disposed within the inner housing.
Figure 6:
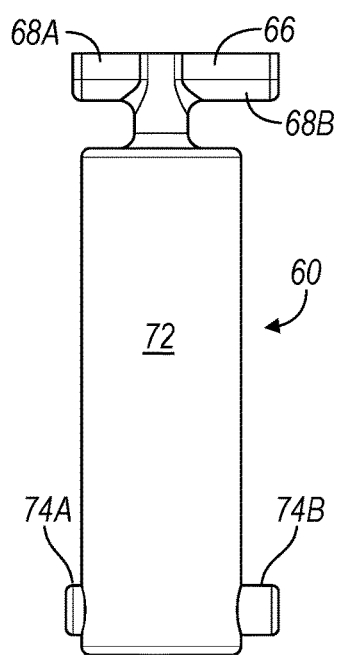
FIG. 6 is a side elevational view of the plunger of FIG. 5.

Referring now to FIGS. 4, 5 and 6, the push to release operator assembly 20 includes an outer shell or housing 40 having an elongate top plate 42 with a truncated oval recess 44 which receives a complementarily configured flange 46 of an inner housing 50. The outer housing 40 includes a hollow cylindrical body 52 extending from the top plate 42 and a flat mounting plate 53 extending along one wall of the cylindrical body 52 which facilitates securement to the fuel inlet assembly 12. Centrally disposed in the top plate 42 of the outer housing 40 is an opening 56 into the interior of the cylindrical body 52 which receives the inner shell or housing 50. The inner housing 50 may be secured to the outer housing 40 by an adhesive 54 applied to the surface of the oval recess 44 and the underside of the flange 46, an interference fit, autogenous bonding, a lip around the edge of the oval recess 44 or similar means.

The inner shell or housing 50 is hollow and receives a rotating and axially translating tappet or plunger 60. The plunger 60 is biased outwardly, this is, away from the bottom of the inner housing 50 by a compression spring 62 disposed in a shouldered recess 64. The plunger 60 includes a crossbar or T-shaped handle 66 extending from a first, outer end. The crossbar 66 has unequal length arms, a first, shorter arm 68A and a second, longer arm 68B. The plunger 60 defines a cylindrical body 72 having a pair of radially extending, unequal length pins adjacent its end opposite the crossbar 66: a first, shorter pin 74A, axially aligned with the first, shorter arm 68A and a second, longer pin 74B, axially aligned with the second, longer arm 68B. The unequal length pins 74A and 74B ensure proper assembly of the plunger 60 within the inner housing 50 so that the shorter and longer arms 68A and 68B of the crossbar 66 properly engage the slot of channel 26 of the latch member 24. The tappet or plunger 60 is preferably hollow, in order to reduce post-casting or post-molding contraction but may be either solid or hollow depending upon manufacturing processes and materials.

Referring to FIG. 7, because of the complexity of the interior of the inner shell or housing 50, it is preferably molded or cast in at least three partial, circumferential segments or sections, a first section 80A, a second section 80B and a third section 80C. Each of the sections 80A, 80B and 80C includes a portion of the flange 46 which are preferably joined by live hinges 82. The incorporation of live hinges 82 assists assembly by not only maintaining the three sections 80A, 80B and 80C in a state and grouping ready for assembly but also assists maintenance of proper axial positions of the sections 80A, 80B and 80C both before and after assembly. In this regard, the second section 80B includes a projection 84 and the first section 80A includes a complementary shoulder 86 and the third section 80C includes a projection 88 and the second section 80B includes a complementary recess 92 which, when the sections 80A, 80B and 80C are assembled (closed), maintain the sections 80A, 80B and 80C in their proper, axial and circumferential positions.

Such maintenance is important because the interiors of the sections 80A, 80B and 80C of the inner housing 50 define diametrically opposed first and second closed or continuous channels or tracks 96 and 98 that receive the pins 74A and 74B of the tappet or plunger 60 and cause it to both rotate and translate axially in response to axial excitation. The first continuous channel or track 96, which is shallower than the track 98 and receives the first, shorter pin 74A, preferably resides almost entirely in the second section 80B of the inner housing 60 and includes an upper sinuous portion 102 and a generally parallel, lower sinuous portion 104. The lower portion 104 includes a recess or latch portion 106 adjacent its lower intersection or merge with the upper portion 102 which receives the first, shorter pin 74A to maintain the plunger 60 in a retracted position and the fuel door 14 in a closed position.

Slight pressure and inward motion on the fuel door 14 and the plunger 60 causes the pin 74A to move to the left in FIG. 7, out of the recess or latch portion 106 of the first track 96 and the compression spring 62 translates the plunger 60 upwardly in FIG. 7 as well as rotating it, both to open the fuel door 14 and to unlatch it. The second continuous channel or track 98 is preferably disposed in both the first section 80A and the third section 80C, is deeper than the first channel or track 96 and thus receives the longer pin 74B of the plunger 60 but is configured to provide operation in the identical manner. Thus, it includes an upper sinuous portion 108 and a generally parallel, lower sinuous portion 110 and a recess or latch portion 112. The inner shell or housing 50 also includes a square lug or projection 114 at its lower extremity that seats within a complementary recess in the outer housing 40 and provides an additional feature to resist rotation of the inner housing 50 within the outer housing 40. It should be understood that the lug or projection 114 may have any convenient shape such as triangular, hexagonal or polygonal which complements the shape of the recess in the outer housing 40.

In addition to the push to release operation of the fuel door 14 provided by the operator assembly 20 described above, the configuration of the inner shell or housing 50 contributes to the overall performance and smooth feel of such operation. The inner surface of the inner housing 50 includes a circumferential groove or channel 116 adjacent the flange 46 which receives an O-ring 118 which provides both an air tight seal between the lower portion of the housing 50 and the ambient and slight resistance to axial translation of the tappet or plunger 60. As illustrated in FIG. 4, the wall of the sections 80A, 80B and 80C of the inner housing 50 include irregularly shaped and arranged through slots 122 aligned with the tracks 96 and 98 that cooperate with the pins 74A and 74B to allow and restrict air flow into and out of the interior of the inner housing 50 to adjust air pressure within the inner housing 50 and thereby adjust the speed and tactile feel of the motion of the plunger 60 and the fuel door 14.

Referring now to FIG. 8, an alternate attachment between the outer shell or housing 40 and the inner shell or housing 50 is illustrated. An alternate embodiment outer housing 40' includes an overhanging lip or ledge 132 adjacent an opening 134 into the interior of the cylindrical body 52'. The ledge or lip 132 cooperates with a flexible latch member 136 extending from the bottom of the inner housing 50'. When the inner housing 50' is aligned with the outer housing 40' as illustrated in FIG. 8, and installed therein, the latch member 136 engages the lip or ledge 132 and positively retains the inner housing 50' within the outer housing 40' and also resists rotation of the inner housing 50' within the outer housing 40'.

Referring now to FIG. 9, an alternate embodiment of the shells or housings is illustrated and designated by the reference number 140. The alternate embodiment inner shell or housing 140 is fabricated in four sections or segments 140A, 140B, 140C and 140D, each section or segment 140A, 140B, 140C and 140D preferably occupying approximately 90°. At three of the four intersections between the four segments 140A, 140B, 140C and 140D, a live hinge 142 extends the full length of the inner housing 140. The live hinges 142 as well as the fourth intersection 144 include axially extending ribs or projections 146. Cooperating with the alternate embodiment inner housing 140, the inner surface of an alternate embodiment cylindrical body 52" of the outer housing 40" includes circumferentially spaced apart and complementary axial slots or channels 148. Together, these features provide an anti-rotation function between the outer housing 40" and the inner housing 140. In the alternate embodiment 140, not only are the sections or segments 140A, 140B, 140C and 140D held together firmly by the three live hinges 142, but the configuration of the mold, particularly the features which create the slots 122 and the draft required to facilitate removal of the segments 140A, 140B, 140C and 140D from the mold, may be somewhat simplified.

The present disclosure offers several advantages. These include a compact push to release and push to latch operator that conveniently mounts on the fuel filler door assembly; a latching mechanism that positively retains the fuel door in a closed position upon closure after a fill up; and smooth opening when the fuel door has been pushed to either open it or close it.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A fuel door operator, comprising, in combination:
an outer housing having an outer flange and an outer cylindrical body having an interior and an opening in the outer flange into the interior,
an inner housing having an inner, hollow cylindrical body received within the interior of the outer cylindrical body, the inner cylindrical body having an open end and a closed end opposite the open end and comprising a plurality of partial circumferential segments, the segments of the inner cylindrical body cooperatively defining a pair of diametrically opposed, continuous helical tracks, each of the tracks having a first portion more proximate the open end, a second portion more proximate the closed end and a recess adjacent an intersection of the first and second portions more proximate the closed end,
a plunger disposed in the inner housing and having a pair of opposed pins disposed in a respective one of the pair of helical tracks and a crossbar at one end, and
a compression spring disposed between another end of the plunger and the closed end of the inner housing.

2. The fuel door operator of claim 1, wherein the partial circumferential segments of the inner cylindrical body include through openings.

3. The fuel door operator of claim 1, wherein the outer flange of the outer housing includes a recess and the inner housing includes a flange received within the recess.

4. The fuel door operator of claim 1, wherein the inner cylindrical body includes four partial circumferential segments coupled along three axially extending live hinges.

5. The fuel door operator of claim 1, further including a fuel door having a latch member aligned with the crossbar of the plunger, the latch member having a slot adapted to receive the crossbar.

6. The fuel door operator of claim 1, further including a polygonal projection on an outside of the closed end of the inner housing.

7. The fuel door operator of claim 1, wherein the depth of one of the pair of helical tracks is greater than the depth of the other of the pair of helical tracks.

8. The fuel door operator of claim 1, further including a circumferential groove extending around the partial segments of the inner cylindrical body adjacent the open end and an O-ring disposed in the circumferential groove.

* * * * *